United States Patent [19]

McAulay

[11] Patent Number: 5,050,117

[45] Date of Patent: Sep. 17, 1991

[54] SPATIAL LIGHT REBROADCASTER OPTICAL COMPUTING CELLS

[75] Inventor: Alastair D. McAulay, Kettering, Ohio

[73] Assignee: Wright State University, Dayton, Ohio

[21] Appl. No.: 475,727

[22] Filed: Feb. 6, 1990

[51] Int. Cl.⁵ .................... G06F 1/04

[52] U.S. Cl. .................... 364/713

[58] Field of Search .................... 364/713, 716, 822; 350/334, 96.11

[56] References Cited

U.S. PATENT DOCUMENTS

| | | | |
|---|---|---|---|
| 4,703,993 | 11/1987 | Hinton et al. | 350/3.72 |
| 4,764,891 | 8/1988 | Grinberg et al. | 364/807 |
| 4,797,843 | 1/1989 | Falk et al. | 364/713 |
| 4,800,519 | 1/1989 | Grinberg et al. | 364/822 |
| 4,842,370 | 6/1989 | Brenner et al. | 360/713 X |
| 4,941,735 | 7/1990 | Moddel et al. | 350/334 X |

OTHER PUBLICATIONS

"Logic and arithmetic with luminescent rebroadcasting devices", Alastair D. McAulay; SPIE, vol. 936 advances in Optical Information Processing III (1988); pp. 321-326.

Optical Computing Digital and Symbolic; edited by Raymond arrathoon; Marcel Dekker, Inc.; Chapter 11; 1989.

Spatial-Light-Modulator Interconnected Computers; Alastair McAulay; Computers, Oct. 1987.

*Primary Examiner*—Gary V. Harkcom
*Assistant Examiner*—Tan V. Mai
*Attorney, Agent, or Firm*—Killworth, Gottman, Hagan & Schaeff

[57] ABSTRACT

Optical computing cells or logic cells are constructed of two or more spatial light rebroadcasters (SLR's). Data or information images in the form of light are written into and read from the SLR's with the SLR's being controlled to process the data in a desired manner. The logic cells can be used generally to construct optical computers and are particularly adapted to the construction of optical subsystems for a digital optical computer. In addition, the logic cells can be used for performing masking, interface, intermediate storage and other operations within an optical computer. Cells made up of only SLR's can be used directly for many applications. The cells also can be modified by the internal or external addition of other optical elements for routing light between or among SLR's of the cells, processing and/or blocking light as the light passes between SLR's of the cells. Such modifications and adaptations complement cells made up only of SLR's to form a family of optical logic cells.

19 Claims, 3 Drawing Sheets

SPATIAL LIGHT REBROADCASTER OPTICAL COMPUTING CELLS

BACKGROUND OF THE INVENTION

The present invention relates generally to optical computing and data processing systems and, more particularly, to optical computing or logic cells constructed of spatial light rebroadcasters which cells can be utilized to construct subsystems for a digital optical computer and for performing masking, interface and other operations within such an optical computer.

The advantages of optical techniques over electronics have long been recognized and have lead to extensive use of optical devices in communications. As the size and speed limitations inherent in present electronic technology are imposing limits on computer development in terms of size reduction and operating speeds, optical techniques are being investigated to overcome the limits. Ideally, optics would initially be added to existing computer systems to perform such operations as storage and intercommunications among multiple processors but in smaller packages and in higher speed devices. Ultimately, optics would substantially replace electronics for performing computational operations in addition to storage and communications.

To this end, architectures for utilizing optical techniques in computers or optical computing are being proposed and tested. One approach has been to construct primitive optical elements which are then interconnected in a truly general Purpose machine. This approach may be traceable back to Dr. Alan Turing who, in the 1950's, preferred such an approach. In any event, such general purpose architectures appear to be the object of proposed optical computer designs incorporating techniques referred to in the literature as Symbolic Substitution and Computational Origami.

For electronic computers, history has shown that the generalized approaches, while arguably theoretically preferable, had to yield to cost effective engineering design considerations which led to constructing computers as interconnected subsystems. Consequently, the architecture proposed much earlier by Babbage for a mechanical computer, "the analytic engine", was adopted.

In this architecture, subsystems are designed for arithmetic, memory, control, input/output and systems software. For the reasons which originally lead to the subsystems approach as well as for accommodating a phased-in introduction of optical components to the extensive amount of electronic computer hardware already in use, it seems likely that a subsystems approach will once again be Preferred. Thus, to construct a competitive optical computer it appears that it will be necessary to first construct subsystems: arithmetic units such as full adders; interconnection networks; control units; and memory units in addition to system software to make the computer easy to use.

A variety of optical elements are currently available for implementing optical computers either in the form of a truly general purpose machine or in the form of interconnected subsystems architecture. Available optical elements include: fiber optics which are already extensively used in communications; spatial light modulators (SLM's) wherein the transmittance or reflectance of pixels of the modulators can be electronically or optically controlled; and, spatial light rebroadcasters (SLR's) which are sensitive to different frequencies of light for writing/reading and luminesce upon being read. Additional optical elements are in the research and development stage and include even once "living" optical computer elements in the form of bacteriorhodopsin protein which has photosynthesis behavior tuned to certain light frequencies.

In view of the different approaches to constructing optical computers, two of which are briefly outlined above, and the variety of optical devices presently or soon to be available to pursue these approaches, there is a need for an optical element or family of optical elements and a strategy for using such optical element(s) which will enable a coherent approach to the development of an optical computer. While it is desirable for the optical element(s) and design strategy to be generally applicable to differing architectures, the optical element(s) and design strategy should be particularly applicable to the development of optical subsystems since this appears to be the presently preferred architecture, both for phase-in and ultimate design of optical computers.

SUMMARY OF THE INVENTION

This need is met by optical computing cells or logic cells in accordance with the present invention which are constructed of two or more spatial light rebroadcasters (SLR's). The logic cells of the present invention can be used generally to construct optical computers and are particularly adapted to the construction of optical subsystems for a digital optical computer. In addition, the logic cells can be used advantageously for Performing masking, interface, intermediate storage and other operations within such an optical computer. The cells can be used directly for many applications and can be modified by the addition of other optical elements for routing light within the cells, processing the light and/or blocking the light within the cells. The cells and cells with such modifications and adaptations form a family of optical logic cells.

In accordance with one aspect of the present invention, an optical logic cell comprises a first spatial light rebroadcaster (SLR) responsive to light of a first wavelength $W_1$ for receiving information into the first SLR. Light of a second wavelength $W_2$ is used for providing information from the first SLR with the information provided from the first SLR being in the form of rebroadcast light of a third wavelength $W_3$. A second SLR is optically coupled to the first SLR and responsive to light of the third wavelength $W_3$ received from the first SLR for receiving information into the second SLR. Light of a fourth wavelength $W_4$ is used for providing information from the second SLR, information being provided from the second SLR in the form of rebroadcast light of a fifth wavelength $W_5$.

In accordance with another aspect of the present invention, an optical logic cell comprises a first spatial light rebroadcaster (SLR) responsive to light of a first wavelength $W_1$ for receiving information into the first SLR. Light of a second wavelength $W_2$ is used for providing information from the first SLR in the form of rebroadcast light of a third wavelength $W_3$. A second SLR is responsive to light of the first wavelength $W_1$ for receiving information into the second SLR and is responsive to light of the second wavelength $W_2$ for providing information from the second SLR in the form of rebroadcast light of the third wavelength $W_3$. Light processing means is interposed between the first SLR and the second SLR for converting light of the third wavelength $W_3$ into light of the first wavelength $W_1$ to transfer information provided from the first SLR into the second SLR.

In accordance with a further aspect of the present invention, an optical logic cell comprises at least one input spatial light rebroadcaster (SLR) responsive to light of a first wavelength $W_1$ for receiving information into the at least one input SLR. Light of a second wavelength $W_2$ is used for providing information from the at least one input SLR in the form of rebroadcast light of a third wavelength $W_3$. At least one intermediate SLR is responsive to light of the third wavelength $W_3$ received from the at least one input SLR for receiving information into the at least one intermediate SLR. Light of a fourth wavelength $W_4$ is used for providing information from the at least one intermediate SLR in the form of rebroadcast light of a fifth wavelength $W_5$. At least one output SLR is responsive to light of the third wavelength $W_3$ for receiving information into the at least one output SLR and is responsive to light of the fourth wavelength $W_4$ for providing information from the at least one output SLR in the form of rebroadcast light of the fifth wavelength $W_5$. Light processing means is interposed between the at least one intermediate SLR and the at least one output SLR for converting light of the fifth wavelength $W_5$ into light of the third wavelength $W_3$ to transfer information read from the at least one intermediate SLR into the at least one output SLR.

In accordance with yet another aspect of the present invention, an optical logic cell comprises a first spatial light rebroadcaster (SLR) responsive to light of a first wavelength $W_1$ for receiving information thereinto and responsive to light of a second wavelength $W_2$ for providing information therefrom. Information provided from the first SLR is in the form of modulated reading light of the second wavelength $W_2$ which is transmitted through the first SLR. A second SLR is responsive to light of the first wavelength $W_1$ for receiving information thereinto and is responsive to light of the second wavelength $W_2$ provided from the first SLR for providing information from the second SLR. Information provided from the second SLR can be in the form of rebroadcast light of a third wavelength $W_3$ or modulated light of the second wavelength $W_2$ which is transmitted through the second SLR. The optical logic cell of this embodiment can further comprise an optical filter between the first SLR and the second SLR for filtering out light of the third wavelength $W_3$. In addition, an optical filter can be positioned behind the second SLR for filtering out light of the second wavelength $W_2$ for output light of the third rebroadcast wavelength $W_3$ or for filtering out light of the third wavelength $W_3$ for output light of the second wavelength $W_2$.

To simplify control and operation of the optical logic cells, the fourth wavelength $W_4$ is preferably made equal to the second wavelength $W_2$. In accordance with one embodiment of the present invention, the first wavelength $W_1$ corresponds to violet light, the second wavelength $W_2$ corresponds to infrared light, the third wavelength $W_3$ corresponds to blue light and the fifth wavelength $W_5$ corresponds to orange light. Where light processing means is utilized, it may comprise an image intensifier or an optically settable liquid crystal device. Such light processing means provides frequency conversion within the optical logic cell, conversion from incoherent light to coherent light and also advantageously Provides light intensity gain often necessary since currently available SLR's do not provide any gain.

It is an object of the present invention to provide logic cells constructed of two or more spatial light rebroadcasters (SLR's) for the construction of optical computers and optical components for electronic computers; to provide logic cells constructed of two or more spatial light rebroadcasters (SLR's) which are particularly adapted for the construction of optical subsystems for a digital optical computer; and, to provide logic cells constructed of two or more spatial light rebroadcasters (SLR's) and other optical elements for routing light, processing light, and/or blocking light within or among cells as necessary for a particular application.

Other objects and advantages of the invention will be apparent from the following description, the accompanying drawings and the appended claims.

DETAILED DESCRIPTION OF THE INVENTION

Figure 1:
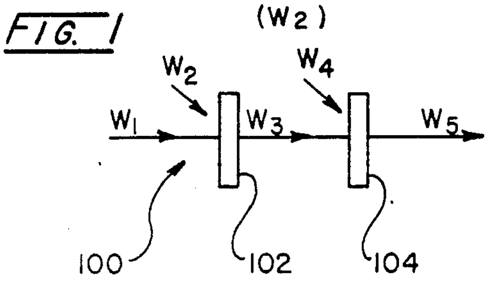
FIG. 1 is a schematic diagram of a first embodiment of an optical logic cell in accordance with the Present invention.

Spatial light rebroadcasters (SLR's) are optical devices which are sensitive to different frequencies of light for receiving information into the devices which will be referred to interchangeably herein as writing information to the devices and for retrieving or providing information from the devices which will be referred to interchangeably herein as reading information from the devices. Information read from the devices is in the form of luminescent light of a frequency different from the writing and reading light frequencies. While such SLR's can be made in a number of ways, one working embodiment of an SLR is constructed as a II-VI semiconductor or, more particularly, a thin crystalline alkali earth sulfide coating on a sapphire or other substrate. Thin film devices have submicron resolution and operate in nanosecond time periods. The luminescent light emitted from such SLR's is incoherent even if the reading and writing illuminations are coherent. It is noted that the reading light passes through the SLR's in varying amounts depending upon the level of transparency of the device being read and is partially coherent.

Electrons are trapped at those points in the material that are exposed to light of a first given frequency. The number of electrons trapped is proportional to the light intensity over a wide range of intensities. Upon exposure to a second given frequency of light, the SLR luminesces at a third given frequency of light at those points where electrons were trapped. For thin samples, the luminescence at each point is proportional to the product of the number of electrons trapped and the intensity of the reading light or light of the second frequency.

Since SLR's can be effectively divided into a large number of pixels, parallel operations can be performed on large numbers of digital bit locations which correspond to the pixel locations on an SLR. For example, parallel ORing of binary images A, B, C, . . . ($S=A+B+C+\ldots$) is performed by writing one image after the other onto an SLR that was previously cleared by flooding with the light of the reading frequency, such as infra-red (IR). On reading the SLR by once again flooding with IR, the intensity of the luminescence at a pixel is at a one (1) level if the energy supplied to that pixel by any of the images was a one (1) at that position. If the signals are not large enough to saturate the SLR material, the OR operation becomes an analog addition operation.

Parallel ANDing of images A and B is performed by writing one image, say A, to the SLR and then reading with the other image B. The luminescent light output at each pixel position is one (1) if and only if the read intensity at that pixel is one (1) and the stored value at that pixel is one (1), i.e. $OUT=A\cdot B$. The energy that was not read out remains for subsequent operations and equals $S=A-(A\cdot B)=A\cdot(1-B)=A\cdot\overline{B}$. It is thus possible to accumulate the AND of a series of inverted binary images. For example, after writing an SLR with A, reading is performed with images B, C, D in sequence or simultaneously. In the sequential case, the second read with C generates $A\cdot\overline{B}\cdot C$ as an output luminescence and leaves $A\cdot\overline{B}-(A\cdot\overline{B}\cdot C)=A\cdot\overline{B}(1-C)=A\cdot\overline{B}\cdot\overline{C}$ stored in the SLR. In the simultaneous case, the output luminescence is $A\cdot(B+C)$, leaving $A-A\cdot(\overline{B+C})=A\cdot\overline{B}\cdot\overline{C}$ stored in the SLR.

If the levels of illumination are insufficient to saturate the SLR, the resulting AND operation becomes an analog multiplication. The reading light is modulated on passing through the SLR because it is absorbed in producing the luminescence where electrons are trapped but is not absorbed where electrons are not trapped. Therefore, the reading light of wavelength $W_2$ that passes through the SLR represents the result of the logic operation $\overline{A}\cdot B$ where A is written with light of wavelength $W_1$ and B is read with light of wavelength $W_2$. If several images C, D, E are first written onto the SLR in series or simultaneously, then reading the SLR with B will produce an output in the wavelength of the reading light of $B\cdot\overline{C+D+E}$ or $B\cdot\overline{C}\cdot\overline{D}\cdot\overline{E}$.

The reading light which passes through an SLR is partially coherent as previously noted and therefore the energy remains closer to the axis of propagation than energy of the incoherent luminescence. Thus, the light patterns between energy of the reading light and energy of the luminescence light may be separated by the geometric orientations of the various devices used to construct logic cells. Alternately or additionally, optical filtering can be provided.

The logic cells of the present invention will now be described with reference to the drawings. FIG. 1 illustrates schematically an optical logic cell 100 in accordance with the present invention wherein the cell 100 is made up of two complementary SLR's. The optical logic cell 100 comprises a first SLR 102 which is responsive to light of a first wavelength $W_1$ for writing information into the first SLR 102. Light of a second wavelength $W_2$ illuminates the first SLR 102 for reading information therefrom. The information read from the first SLR 102 is in the form of rebroadcast light of a third wavelength $W_3$. A second SLR 104 of the cell 100 is responsive to light of the third wavelength $W_3$ received from the first SLR 102 for writing information into the second SLR 104. To retrieve information from the second SLR 104, it is illuminated by light of a fourth wavelength $W_4$ Information read from the second SLR 104 is in the form of rebroadcast light of a fifth wavelength $W_5$.

While five different wavelengths $W_1$-$W_5$ are applicable for the most generalized operation of the cell 100, preferably $W_2$ is made equal to $W_4$, as shown parenthetically in FIG. 1, for ease of operation and implementation. The reading illumination $W_2$ or $W_4$ is oriented at other than 90° relative to an associated SLR as indicated by angularly oriented arrows. In this way, a negligible amount of the reading illumination of one SLR impinges upon another SLR which succeeds it due to the Partial coherence of the reading illumination and its tendency to remain closer to its axis of propagation. To ensure that there is no interference, optical filters can also be used between two successive SLR's as previously mentioned.

In one working embodiment of the optical logic cell 100, the operating light frequencies were selected as follows: the first wavelength $W_1$ corresponds to violet light; the second wavelength $W_2$ corresponds to infrared light; the third wavelength $W_3$ corresponds to blue light; and, the fifth wavelength $W_5$ corresponds to orange light. These light frequencies or wavelengths are illustrated graphically in FIGS. 1A and 1B for the first SLR 102 and the second SLR 104, respectively.

Figure 1A:
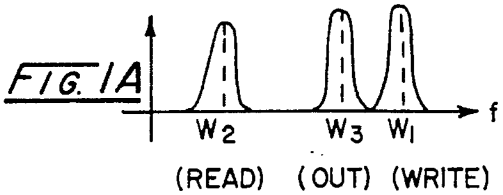
FIGS. 1A and 1B graphically illustrate the writing/-reading and luminescent light wavelengths for two SLR's which can be utilized to construct the optical logic cell of FIG. 1.
Figure 1B:
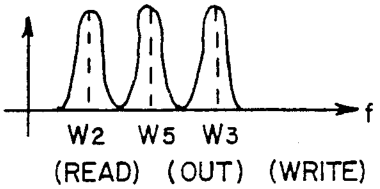

FIGS. 1, 1A and 1B illustrate one basic optical logic cell in accordance with the present invention. For many applications, it is desirable to provide other optical logic cell embodiments which may include additional SLR's and/or other optical elements. Optical elements which can be included within or used with optical logic cells of the Present invention include without limitation: elements for routing light within, between or among SLR's and/or cells such as fully reflective mirrors, fiber optics, dichroic mirrors, and the like; elements for processing the light such as filters, image intensifiers and optically activated liquid crystal light valves (OLCLV); and, elements for blocking light passage within, between or among SLR's and/or cells such as various shutter devices. Alternate embodiments of optical computing logic cells from the most basic to very complicated can be combined as needed to construct digital optical computers, subsystems or other digital optical computer elements.

Figure 2A:
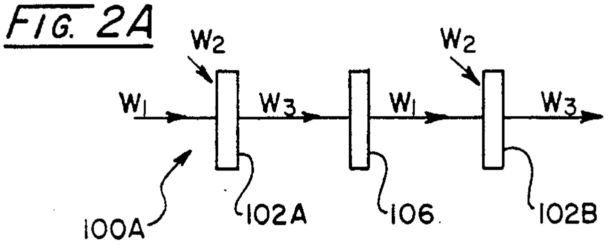
FIGS. 2A and 2B are schematic diagrams of second and third illustrative embodiments of optical logic cells in accordance with the present invention.

In accordance with the concept of a family of optical computing logic elements of the present invention, FIG. 2A schematically illustrates a second embodiment of a logic cell 100A. The optical logic cell 100A comprises a first spatial light rebroadcaster (SLR) 102A responsive to light of a first wavelength $W_1$ for writing information into the first SLR 102A. Light of a second wavelength $W_2$ is used for reading information from the first SLR 102A, with the information read from the first SLR 102A being in the form of rebroadcast light of a third wavelength $W_3$. A second SLR 102B substantially identical to the first SLR 102A is responsive to light of the first wavelength $W_1$ for writing information into the second SLR 102B and light of the second wavelength $W_2$ for reading information from the second SLR 102B. Here too, information read from the second SLR 102B appears in the form of rebroadcast light of the third wavelength $W_3$.

In the embodiment of FIG. 2A, light processing means 106 is interposed between the first SLR 102A and the second SLR 102B for converting light of the third wavelength $W_3$ into light of the first wavelength $W_1$ to write information read from the first SLR 102A into the second SLR 102B. The light processing means 106 preferably also further provides for amplifying the intensities of light of the first wavelength $W_1$. The light processing means 106 may comprise an image intensifier, an optically activated liquid crystal light valve (OLCLV) or other appropriate device. The light processing means 106, by providing frequency conversion and/or light output intensity gain, facilitates interfacing SLR's within a light cell and interfacing light cells to one another.

Figure 2B:
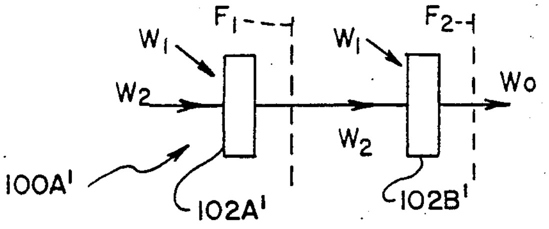

FIG. 2B illustrates a third embodiment of a logic cell 100A' which is an alternate form of the logic cell 100A. The optical logic cell 100A' comprises a first SLR 102A' responsive to light of a first wavelength $W_1$ for writing information into the first SLR 102A'. Light of a second wavelength $W_2$ is used for reading information from the first SLR 102A', with the information read from the first SLR 102A' being in the form of reading light of the second frequency $W_2$ which is transmitted through the SLR 102A'. A second SLR 102B' substantially identical the first SLR 102A' is responsive to light of the first wavelength $W_1$ for writing information into the second SLR 102B' and light of the second wavelength $W_2$ for reading information in the form of output light $W_0$ from the second SLR 102B'. The reading light in this embodiment is the modulated or filtered reading light output from the first SLR 102A'. Information read from the second SLR 102B' appears in the form of the output light $W_0$ which can be either light of wavelength $W_2$ *or* $w_3$ dependent upon the operation to be performed by the logic cell 100A'. Optical filters $F_1$ and $F_2$ can be provided, if necessary, to filter out light of the third wavelength $W_3$ in the case of $F_1$ or to filter out the unwanted output, either wavelength $W_2$ or wavelength $W_3$, to result in the desired output light being of either wavelength $W_3$ or wavelength $W_2$, respectively.

Figure 3:
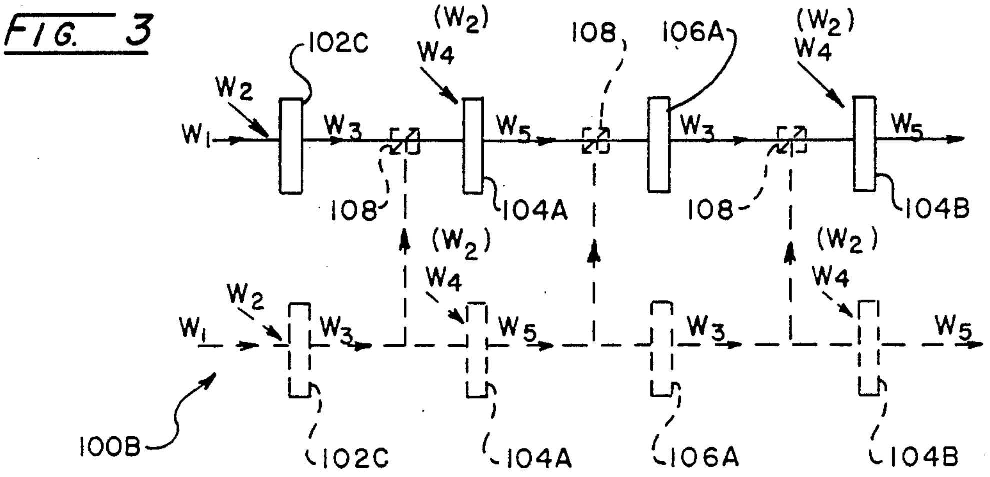
FIG. 3 is a schematic diagram of a fourth embodiment of an optical logic cell in accordance with the present invention.

A fourth, substantially more complicated embodiment of a logic cell 100B is illustrated in FIG. 3. The optical logic cell 100B of FIG. 3 comprises at least one input spatial light rebroadcaster (SLR) 102C responsive to light of a first wavelength $W_1$ for writing information into the at least one input SLR 102C. Light of a second wavelength $W_2$ is used for reading information from the at least one input SLR 102C with information read from the at least one input SLR 102C being in the form of rebroadcast light of a third wavelength $W_3$. At least one intermediate SLR 104A responsive to light of the third wavelength $W_3$ received from the at least one input SLR 102C for writing information into the at least one intermediate SLR 104A. The at least one intermediate SLR 104A is responsive to light of a fourth wavelength $W_4$ for reading information therefrom with such information being in the form of rebroadcast light of a fifth wavelength $W_5$. While five different wavelengths $W_1$–$W_5$ are applicable for the most generalized operation of the cell 100B, preferably $W_2$ is made equal to $W_4$, as shown parenthetically in FIG. 3, for ease of operation and implementation.

At least one output SLR 104B is responsive to light of the third wavelength $W_3$ for writing information thereinto. The at least one output SLR 104B is responsive to light of the fourth wavelength $W_4$ for reading information therefrom with such information being in the form of rebroadcast light of the fifth wavelength $W_5$. Light processing means 106A is interposed between the at least one intermediate SLR 104A and the at least one output SLR 104B for converting light of the fifth wavelength $W_5$ into light of the third wavelength $W_3$ to write information read from the at least one intermediate SLR 104A into the at least one output SLR 104B. Beam splitters 108 or other optical devices can be provided to intercouple various paths within an optical computing cell and/or between or among two or more optical computing cells, such as the cells 100B.

While FIGS. 2A and 2B illustrate somewhat more complicated optical logic cells in accordance with the present invention, they are still relatively basic cells. FIG. 3 illustrates a substantially more complicated optical computing logic cell 100B. However, it should be apparent in view of the present disclosure that a large variety of optical computing logic cells can be constructed in accordance with the present invention. Thus, the serial full adder of FIG. 4 and the programmable logic array (PLA) of FIG. 6 can be constructed as specialized optical logic cells as illustrated or can be constructed by combining more simplified optical logic cells to arrive at the structure illustrated. Identification of various groupings of SLR's in FIGS. 4 and 6 should be apparent to arrive at logic cells 100, 100A and/or 100B or alternate groupings which would include subcombinations of one or more of the logic cells 100, 100A and/or 100B. The determination of how to implement a digital optical computer in accordance with the teachings of the present invention will depend upon the volume of such products to be made, the stage of development of the products and similar considerations.

Figure 4:
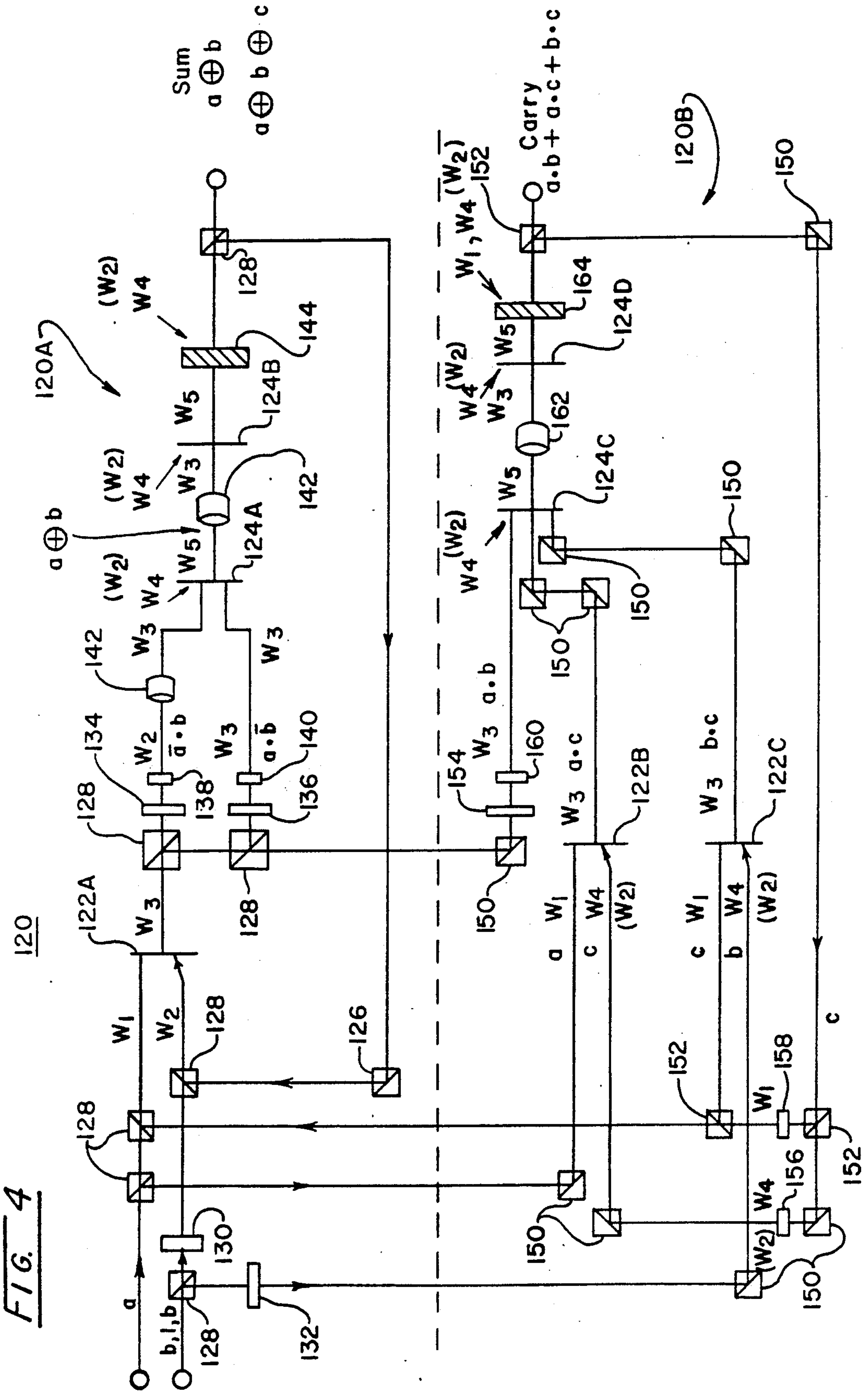
FIG. 4 is a schematic diagram illustrating implementation of a serial full adder utilizing optical logic cells of the present invention.

The serial full adder 120 of FIG. 4 will now be described. As previously mentioned, SLR's can be effectively divided into a large number of pixels such that parallel operations can be performed on large numbers of digital bit locations which correspond to the pixel locations on an SLR. Accordingly, the serial full adder of FIG. 4 computes a large number of additions of binary numbers, each performed in a serial manner. At each significant bit, three bits are input for each pair of numbers to be added, one bit from each number and the third carried from the addition of the bit lower in significance. The output for each significant bit is a sum and a carry. The adders consist of a sum portion 120A that computes the sum and a carry portion 120B that computes the carry. As shown in FIG. 4, the serial full adder 120 is constructed of SLR's of the two types illustrated in FIGS. 1, 1A, 1B and 2A together with other optical elements as will be described. SLR's of the serial full adder 120 which are the same as the SLR 102 of FIG. 1 will be designated 122 and SLR's which are the same as the SLR 104 of FIG. 1 will be designated 124.

The sum portion 120A comprises three SLR's 122A, 124A and 124B. Other optical elements of the sum portion 120A include: a fully reflective mirror 126; seven dichroic mirrors 128; shutters 130, 132, 134 and 136; filters 138 and 140; two image intensifiers 142; and, optically activated liquid crystal light valve (OLCLV) 144. The carry portion 120B comprises four SLR's 122B, 122C, 124C and 124D. Other optical elements of the carry portion 120B include: ten fully reflective mirrors 150; three dichroic mirrors 152; a shutter 154; filters 156, 158 and 160; image intensifier 162; and, OLCLV 164. The wavelengths of the light occurring within the serial full adder 120 are shown on FIG. 4 as are the resulting combinations of the input images a and b. Sequential control of the serial full adder 120 of FIG. 4 is in accordance with the following timing diagram:

Timing for SLR Parallel Adder

| Operation | Time | Write W<br>Read R | Value | Device | Comment |
|---|---|---|---|---|---|
| (i) | Init | R | | 124D | Initialization, outside loop |
| $a \oplus b$ | 1 | R | 1 (clear) | → | All SLRs except |
| | | Close | | 130,134,154 | Allows light to pass |
| | | Open | | 136 | Blocks light |
| | 2 | W | a | 122A | |
| | | W | a | 122B | for carry |
| | 3 | R | b | 122A | generate $a \cdot b$, $\bar{a} \cdot b$ |
| | | W | $\bar{a} \cdot b$ | 124C | for carry |
| | | W | $a \cdot b$ | 124A | |
| | 4 | Close | | 136 | |
| | | Open | | 134,154 | |
| | 5 | R | 1 | 122A | also clears 122A |
| | | W | $a \cdot \bar{b}$ | 124A | $a \oplus b$ formed |
| | 6 | R | 1 | 124A | also clears (or clear later 142 off) |
| | | W | $a \oplus b$ | 124B | store $a \oplus b$ part of sum |
| | | Close | | 134 | |
| | | Open | | 136 | |
| (ii) | 7 | R | 1 | 124D | use old carry (not all read out) |
| carry c | | W | c | 164 | $c = a \cdot b + a \cdot c + b \cdot c$ |
| | | R | $\omega_1$ | 164 | c |
| | | W | c | 122A | at input 1 |
| | | W | c | 122C | |
| | | Close | | 132 | |
| | | Open | | 130 | directs b to carry |
| | 8 | R | 1 | 124D | read rest out for c |
| | | W | c | 164 | |
| | | R | $\omega_4$ | 164 | |
| | | R | c | 122B | form $a \cdot c$ |
| | | W | $a \cdot c$ | 124C | |
| | 9 | R | b | 122C | form $b \cdot c$ |
| | | W | $b \cdot c$ | 124C | new carry formed |
| | | R | 1 (clear) | 124D | clear old carry |
| | 10 | R | 1 | 124C | also clears (or clear later 162 off) |
| | | W | c | 124D | store new carry |
| (iii) | 11 | R | 1 | 124B | |
| $c \oplus (a \oplus b)$ | | W | $a \oplus b$ | 144 | |
| (repeats (i) with | | R | $a \oplus b$ | 144 | |
| b replaced by | | R | $\overline{a \oplus b}$ | 122A | |
| $a \oplus b$) | | W | $\bar{c} \cdot (a \oplus b)$ | 124A | through |
| | 12 | Close | | 130,136 | |
| | | Open | | 134 | |
| | 13 | R | 1 | 122A | |
| | | W | $c \cdot \overline{a \oplus b}$ | 124A | Form $s \oplus b \oplus c$ |
| | 14 | R | 1 | 124A | |
| | | W | $a \oplus b \oplus c$ | 124B | stores $a \oplus b \oplus c$ |
| | 15 | R | 1 | 124B | |
| | | W | $a \oplus b \oplus c$ | 144 | |
| | | R | 1 | 124B | $a \oplus b \oplus c$ |
| | | R | $a \oplus b \oplus c$ | 144 | Output sum |
| | To 1 | | | | return for next sig. bit |

Figure 5:
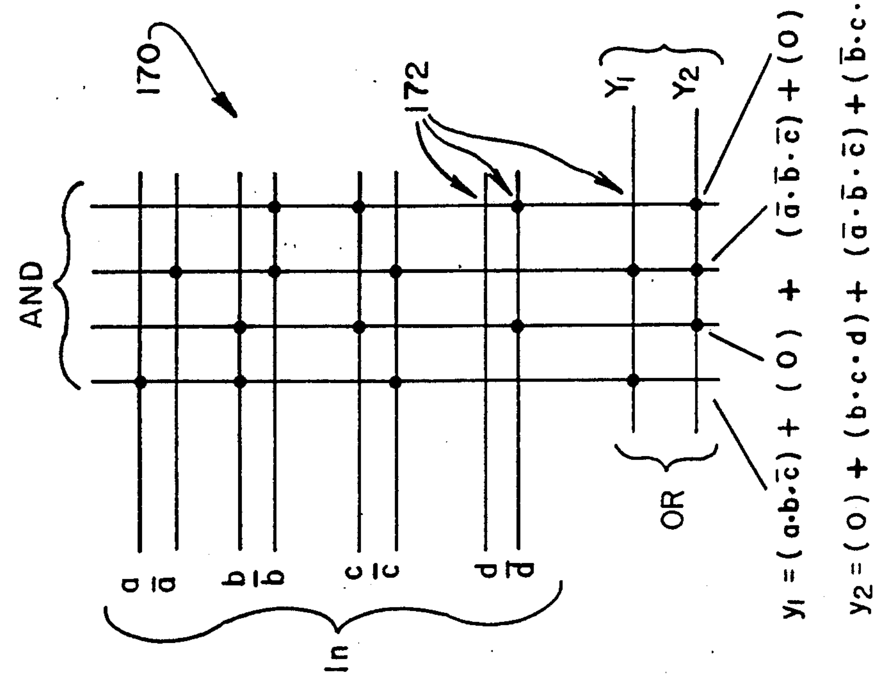
FIG. 5 is a schematic diagram illustrating implementation of a programmable logic array (PLA) in conventional electronic circuitry.

FIG. 5 schematically illustrates implementation of a programmable logic array (PLA) 170 in conventional electronic circuitry. PLA's are commonly used in electronic design and are provided to the user as a standard device which is then "burned" or programmed to define the desired connections or opens at corresponding crosspoints 172. Once the PLA 170 is Programmed by a user, the PLA 170 generates logical combinations as specified by the user's programming. As shown in FIG. 5, the outputs of the PLA 170 are defined by the Boolean equations $y_1$ and $y_2$.

Figure 6:
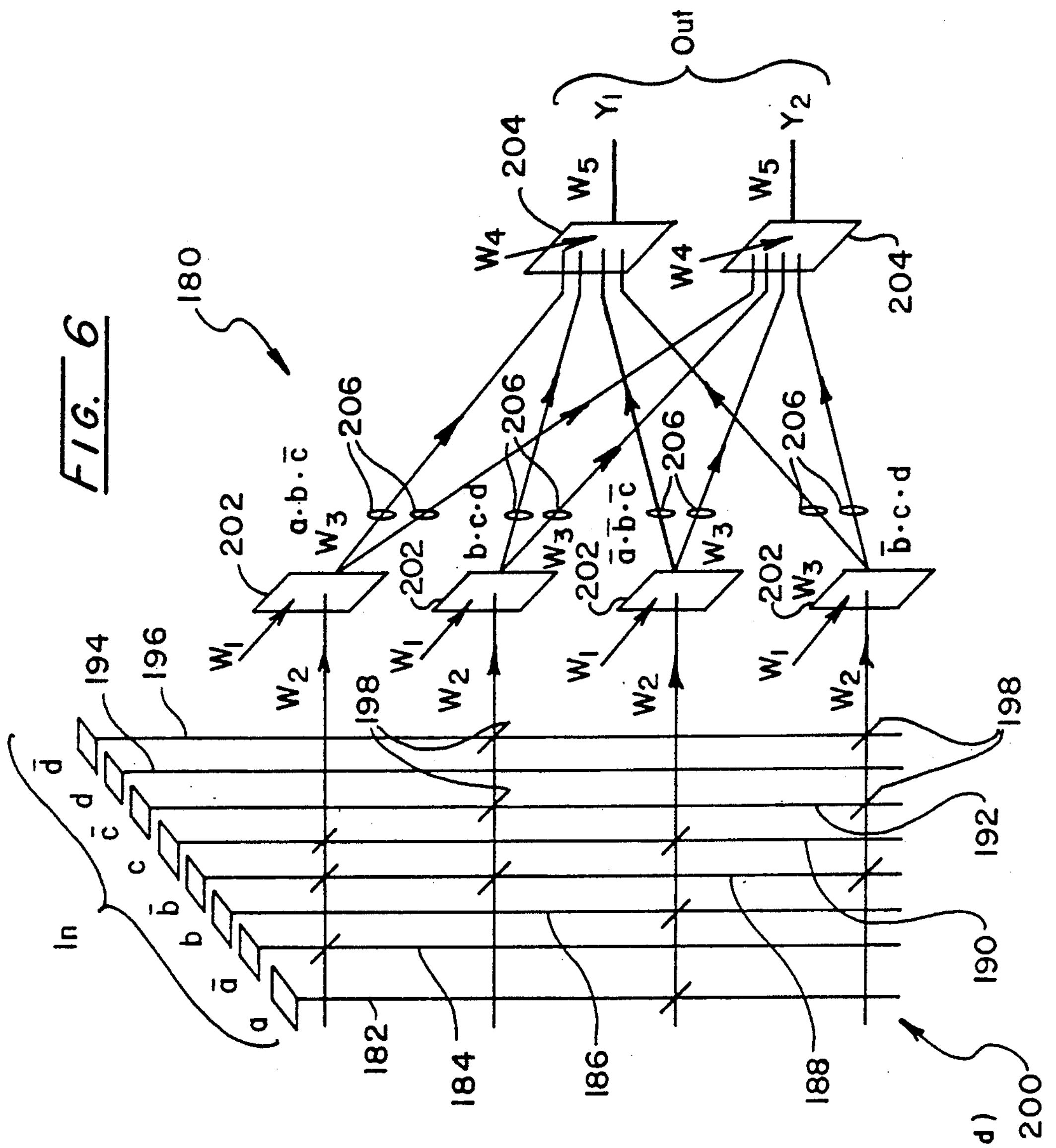
FIG. 6 is a schematic diagram illustrating implementation of a programmable logic array (PLA) utilizing optical logic cells of the present invention.

FIG. 6 schematically illustrates implementation of a corresponding optical PLA 180 utilizing optical computing logic cells in accordance with the present invention. Here again, the PLA 180 could be constructed as a single logic cell or could be constructed of combinations of smaller, more basic cells, such as the one shown in FIG. 1. As shown in FIG. 6, optical input arrays a, $\bar{a}$, b, $\bar{b}$, c, $\bar{c}$, d and $\bar{d}$ are applied by illuminating the corresponding columns 182–196. Dichroic mirrors 198 are indicated by angularly oriented slashes in an array 200 of the PLA 180.

The dichroic mirrors 198 could be initially formed into the array 200 with unwanted mirrors being "burned" away or otherwise removed from the optical paths corresponding to columns 182–196 to permit the user to program the PLA 180. Alternately, arrangements can be envisioned for selectively placing dichroic mirrors, deflecting previously formed dichroic mirrors or the like.

SLR's 202 and 204 are provided and are substantially the same as the SLR's 102 and 104, respectively of FIG. 1. The SLR's 202 are initially entirely written with all ones (1's) by uniform illumination of light at wavelength $W_1$. The input arrays a, $\bar{a}$, b, $\bar{b}$, c, $\bar{c}$, d, $\bar{d}$ are then illuminated with light of wavelength $W_2$ either sequentially or simultaneously. If a,b and c are illuminated and imaged onto an SLR, the output luminescence at wavelength $W_3$ is $1\cdot(a+b+c)=a+b+c$. The stored energy remaining is $1\cdot(a+\overline{b+c}=\bar{a}\cdot\bar{b}\cdot\bar{c}$. Uniform light of wavelength $W_2$ is now used to read out the stored energy at wavelength $W_3$ which is supplied as an input to the SLR's 204, which store inputs from all the SLR's 202. Reading the SLR's 204 with light of wavelength $W_4$ generates the desired output in the form of light of wavelength $W_5$.

SLR's which have an output at the required wavelength of the read input of the next succeeding SLR's may also be used to avoid the need for providing complementary inputs separately. For this case, the SLR's 202 and 204 are of the same type as the SLR's 102A' and 102B' of FIG. 2B. The input arrays are illuminated with light of wavelength $W_1$, SLR's 202 are read with light of wavelength $W_2$ and the output of the SLR's 202 at wavelength $W_2$ is summed or ORed by the SLR's 204 which have been previously totally illuminated by light of wavelength $W_1$. From the foregoing description, it will be apparent that many other alternates are possible for constructing PLA's as well as other desired devices in an optical form.

Finally, shutters 206 are provided and opened or closed by the user of the PLA 180 to arrive at the final desired output. In the PLA 180 of FIG. 6, the first, fourth, fifth, sixth and eighth shutters 206 from the top of the drawing are controlled to pass optical signals to arrive at light outputs from the PLA 180 which correspond to the Boolean equations $y_1$ and $y_2$ of FIG. 5.

Having thus described the optical computing logic cells of the present invention in detail and by reference to preferred embodiments thereof, it will be apparent that modifications and variations are possible without departing from the scope of the invention defined in the appended claims.

What is claimed is:

1. An optical logic cell comprising:

a first spatial light rebroadcaster (SLR) responsive to light of a first wavelength $W_1$ for receiving information into said first SLR and responsive to light of a second wavelength $W_2$ for providing information from said first SLR, information provided from said first SLR being in the form of rebroadcast light of a third wavelength $W_3$; and a second SLR responsive to light of said third wavelength $W_3$ received from said first SLR for receiving information into said second SLR and responsive to light of a fourth wavelength $W_4$ for providing information from said second SLR, information provided from said second SLR being in the form of rebroadcast light of a fifth wavelength $W_5$.

2. An optical logic cell as claimed in claim 1 wherein said fourth wavelength $W_4$ is equal to said second wavelength $W_2$.

3. An optical logic cell as claimed in claim 2 wherein said first wavelength $W_1$ corresponds to violet light, said second wavelength $W_2$ corresponds to infrared light, said third wavelength $W_3$ corresponds to blue light and said fifth wavelength $W_5$ corresponds to orange light.

4. An optical logic cell comprising:

a first spatial light rebroadcaster (SLR) responsive to light of a first wavelength $W_1$ for receiving information into said first SLR and responsive to light of a second wavelength $W_2$ for providing information from said first SLR, information provided from said first SLR being in the form of rebroadcast light of a third wavelength $W_3$;

a second SLR responsive to light of said first wavelength $W_1$ for receiving information into said second SLR and responsive to light of said second wavelength $W_2$ for providing information from said second SLR, information provided from said second SLR being in the form of rebroadcast light of said third wavelength $W_3$; and light processing means interposed between said first SLR and said second SLR for converting light of said third wavelength $W_3$ into light of said first wavelength $W_1$ to transfer information provided from said first SLR into said second SLR.

5. An optical logic circuit as claimed in claim 4 wherein said light processing means further provides for amplifying the intensities light of said first wavelength $W_1$.

6. AN optical logic cell as claimed in claim 4 wherein said light processing means comprises an image intensifier.

7. An optical logic cell as claimed in claim 4 wherein said light processing means comprises an optical liquid crystal device.

8. An optical logic cell comprising:

at least one input spatial light rebroadcaster (SLR) responsive to light of a first wavelength $W_1$ for receiving information into said at least one input SLR and responsive to light of a second wavelength $W_2$ for providing information from said at least one input SLR, information provided from said at least one input SLR being in the form of rebroadcast light of a third wavelength $W_3$;

at least one intermediate SLR responsive to light of said third wavelength $W_3$ provided by said at least one input SLR for receiving information into said at least intermediate SLR and responsive to light of a fourth wavelength $W_4$ for providing information from said at least one intermediate SLR, information provided from said at least one intermediate SLR being in the form of rebroadcast light of a fifth wavelength $W_5$;

at least one output SLR responsive to light of said third wavelength $W_3$ for receiving information into said at lest one output SLR and responsive to light of said fourth wavelength $W_4$ for providing information from said at least one output SLR, information provided from said at least one output SLR being in the form of rebroadcast light of said fifth wavelength $W_5$; and light processing means interposed between said at least one intermediate SLR and said at least one output SLR for converting light of said fifth wavelength $W_5$ into light of said third wavelength $W_3$ to transfer information provided from said at least one intermediate SLR into said at least one output SLR.

9. An optical logic cell as claimed in claim 8 wherein said fourth wavelength $W_4$ is equal to said second wavelength $W_2$.

10. An optical logic cell as claimed in claim 9 wherein said first wavelength $W_1$ corresponds to violet light, said second wavelength $W_2$ corresponds to infrared light, said third wavelength $W_3$ corresponds to blue light and said firth wavelength $W_5$ corresponds to orange light.

11. An optical logic cell as claimed in claim 8 wherein said light processing means comprises an image intensifier.

12. An optical logic cell as claimed in claim 8 wherein said light processing means comprises an optical liquid crystal device.

13. An optical logic cell as claimed in claim 8 wherein said light processing means further provides for amplifying the intensities of light of said third wavelength $W_3$.

14. An optical logic cell comprising:

a first spatial light rebroadcaster (SLR) responsive to light of a first wavelength $W_1$ for receiving information into said first SLR and responsive to light of a second wavelength $W_2$ for providing information from said first SLR, information provided from said first SLR being in the form of modulated light of said second wavelength $W_2$ which is transmitted through said first SLR; and a second SLR responsive to light of said first wavelength $W_1$ for receiving information into said second SLR and responsive to light of said second wavelength $W_2$ read from said first SLR for providing information from said second SLR, information provided from said second SLR being in the form of rebroadcast light of a third wavelength $W_3$.

15. An optical logic cell as claimed in claim 14 further comprising an optical filter between said first SLR and said second SLR for filtering out light of said third wavelength $W_3$.

16. An optical logic cell as claimed in claim 15 further comprising an optical filter positioned behind said second SLR for filtering out light of said second wavelength $W_2$.

17. An optical logic cell comprising:

a first spatial light rebroadcaster (SLR) responsive to light of a first wavelength $W_1$ for receiving information into said first SLR and responsive to light of a second wavelength $W_2$ for providing information from said first SLR, information provided from said first SLR being in the form of modulated light of said second wavelength $W_2$ which is transmitted through said first SLR; and a second SLR responsive to light of said first wavelength $W_1$ for receiving information into said second SLR and responsive to light of said second wavelength $W_2$ provided from said first SLR for providing information from said second SLR, information provided from said second SLR being in the form of modulated light of said second wavelength $W_2$ which is transmitted through said second SLR.

18. An optical logic cell as claimed in claim 17 further comprising an optical filter between said first SLR and said second SLR for filtering out light of said third wavelength $W_3$.

19. An optical logic cell as claimed in claim 18 further comprising an optical filter positioned behind said second SLR for filtering out light of said third wavelength $W_3$.

* * * * *

UNITED STATES PATENT AND TRADEMARK OFFICE
CERTIFICATE OF CORRECTION

PATENT NO. : 5,050,117
DATED : September 17, 1991
INVENTOR(S) : Alastair D. McAulay

It is certified that error appears in the above-identified patent and that said Letters Patent is hereby corrected as shown below:

Column 12, Line 23, "logic circuit", should be --logic cell--.

Column 12, Line 27, "AN", should be --An--.

Column 12, Line 45, "at least intermediate", should be --at least one intermediate--.

Column 12, Line 53, "at lest", should be --at least--.

Signed and Sealed this

Twentieth Day of April, 1993

*Attest:*

MICHAEL K. KIRK

*Attesting Officer*

*Acting Commissioner of Patents and Trademarks*